United States Patent [19]

Hutton et al.

[11] 3,826,600
[45] July 30, 1974

[54] APPARATUS FOR THE PRODUCTION OF GRAMOPHONE RECORDS WITH LABELS ATTACHED THERETO

[75] Inventors: Henry James Hutton, Pinner; Alan Thompson, Uxbridge, both of England

[73] Assignee: EMI Limited, Hayes, England

[22] Filed: June 30, 1972

[21] Appl. No.: 268,169

[30] Foreign Application Priority Data
July 5, 1971  Great Britain.................... 31316/71

[52] U.S. Cl.............. 425/123, 425/126 R, 425/127, 425/129, 425/810, 425/DIG. 55
[51] Int. Cl............................................... B29f 1/10
[58] Field of Search .......... 425/123, 126, 129, 127, 425/324, DIG. 810, DIG. 55, DIG. 210, 126 R; 264/106, 107, 261

[56] References Cited
UNITED STATES PATENTS
3,084,390  4/1963  Anderson...................... 425/DIG. 55
3,113,905  12/1963  Rosen............................ 425/810 X
3,279,936  10/1966  Forestek...................... 425/DIG. 55
3,412,427  11/1968  Flusfeder et al............... 425/810 X
3,557,406  1/1971  Strausfield........................ 425/123
3,662,051  5/1972  Harlow.............................. 264/107
3,663,136  5/1972  Westermann.............. 425/DIG. 210

Primary Examiner—J. Spencer Overholser
Assistant Examiner—David S. Safran
Attorney, Agent, or Firm—Fleit, Gipple & Jacobson

[57] ABSTRACT

Apparatus of, and a method for, the production of gramophone records is described. Mouldable material is extruded, to form a shot, into a shot forming cavity which is at least partially closed during formation of the shot by a label magazine. In a preferred embodiment, the shot is formed in a cavity which is partially bounded by each of two label magazines.

5 Claims, 6 Drawing Figures

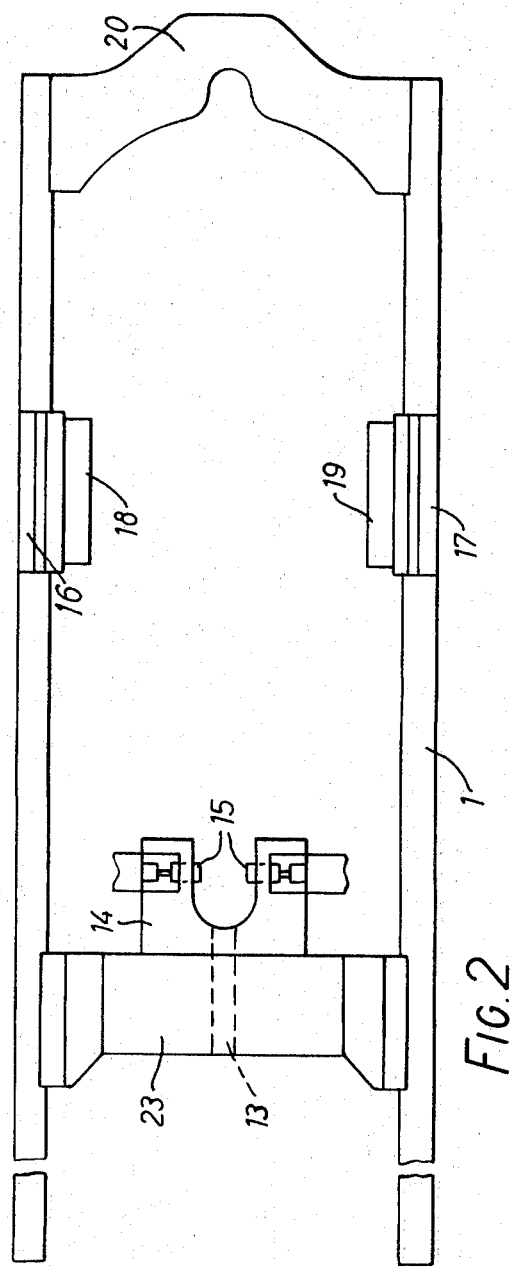
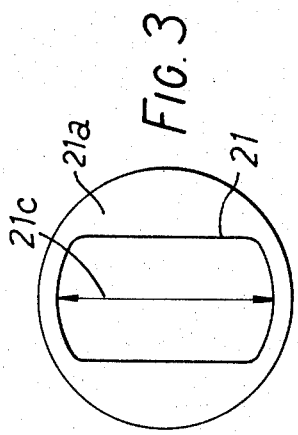
Fig. 2
Fig. 3

APPARATUS FOR THE PRODUCTION OF GRAMOPHONE RECORDS WITH LABELS ATTACHED THERETO

This invention relates to the production of gramophone records, and more particularly to apparatus for forming a shot of mouldable record material having record labels adhering thereto.

It is an object of the invention to provide an improved gramophone record producing apparatus.

According to the invention there is provided apparatus for the production of gramophone records in which, in operation, a shot of mouldable record material with labels adhering thereto is formed and then transferred with the labels to a record moulding station, the apparatus including a record moulding press, transport means for transferring the shot and adhering labels to said moulding press, means defining a shot forming cavity and means for extruding record material into said cavity to form said shot, the arrangement being such that parts of said cavity defining means comprise respective parts of a pair of label magazines while said record material is extruded into said cavity and into contact with an exposed part of a respective label in each said magazine, said respective parts of said magazines comprising respective end plates having respective substantially ablong apertures therein exposing said exposed parts of said respective labels and through which apertures said respective labels can be withdrawn from said magazines.

In order that the present invention may be fully understood and readily carried into effect it will now be descirbed with reference to the accompanying drawings, in which:

FIG. 2 shows the moveable sled for the apparatus of FIG. 1,

FIG. 3 shows the closure plate for one of the magazines,

Figure 1:
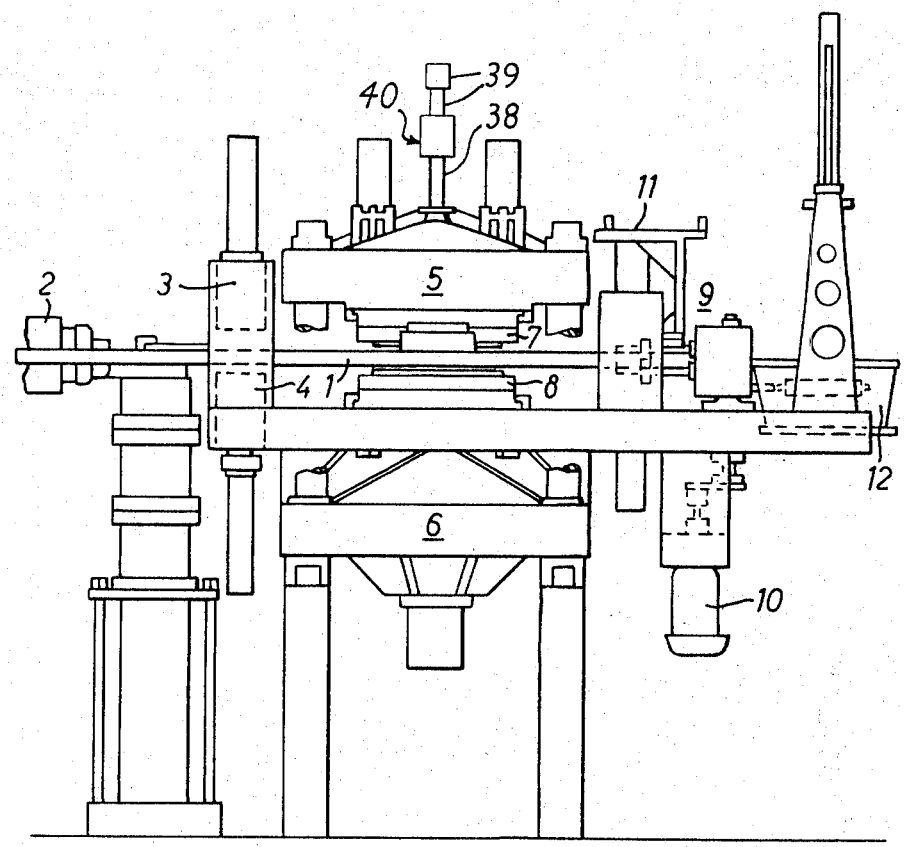
FIG. 1 shows one example of apparatus accordng to the invention.

The apparatus to be described for producing gramophone records is shown in elevation by FIG. 1 and has four work stations, namely; an extrusion/shot forming station; a record moulding station; a flash trimming station; and a record stacking station. The record in its various stages of manufacture from shot to trimmed record is transported from station to station by means of a moveable sled 1 whose structure will be described subsequently. A motor 2 drives an extrusion device which extrudes molten record material under pressure into a cavity formed by the upper and lower record label magazines, shown generally by references 3 and 4 respectively, and part of sled 1. The shot forming mechanism will be described subsequently. When a shot has been formed it is transported, with record labels adhering thereto, by means of sled 1 to a record moulding station, the sled at the same time transporting a moulded record to the flash trimming station. The moulding station includes a moulding press comprising a pair of relatively massive bolsters 5 and 6 carrying respective plattens 7 and 8 each of which carries a matrix for a respective side of the record. Bolster 5 is fixed and bolster 6 is moveable in the vertical direction to effect moulding of the record from the shot between plattens 7 and 8 in known manner using heat and pressure. When the record has been moulded it is transported by sled 1 to the trimming station shown generally at 9. As a record is transported to the trimming station 9, so the record which has just been trimmed is automatically placed into a stacking bin 12, a cardboard spacer being placed in the stack after every fifth record (say). The trimming station 9 includes a flash cutting arrangement including cutters, which are driven by a motor 10, and are moveable in a plane at right angles to the plane of the record and from underneath the record for effecting removal of the flash. This has the advantage that the flash which droops downwards from the circumference of the record, is trimmed in a cleaner manner as the cutters approach it from underneath rather than in the plane of the record.

Thus while one shot is being formed with labels adhering thereto, another is being moulded into a record and a moulded record is having its flash trimmed prior to stacking.

Figure 5:
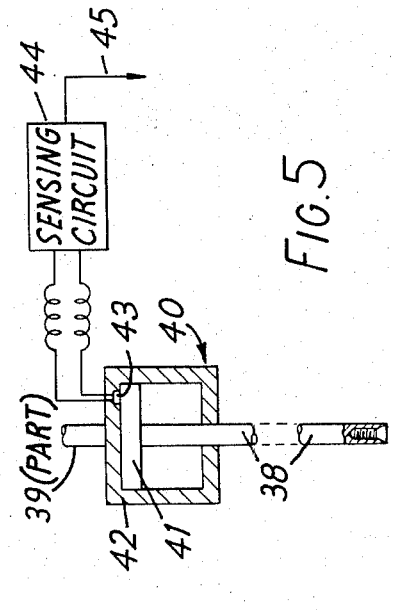
FIG. 5 shows a detailed view of part of the apparatus shown in FIG. 1.

The sled 1 may for example, take the form which is shown in plan view by FIG. 2. At one end is formed a transverse member 23 which is fixedly mounted at either end to a respective one of a pair of longitidinal arms of the sled 1. The member 23 is provided with a central longitudinally directed cylindrical bore 13. In this example, a member 14 is attached to member 23 and has a C-shaped cavity cut-out, bore 13 also extending through member 14 to this cavity. In operation molten record material is extruded through bore 13, the C-shaped cavity of member 14, when closed by means of magizines 3 and 4 as will be explained subsequently, forming a shot forming cavity. Member 14 is provided with a pair of piston operated grippers 15 of rectangular cross-section, around which the shot is formed, grippers 15 being shown in the position for shot forming. The grippers 15 are preferably formed of P.T.F.E. (polytetra fluoroethylene). Sled 1 is then caused to move to the right so as to transport the shot and adhering labels to the moulding station where the shot is held by means of a rod 38 which is driven into the shot, through a label contre hole, by means of a piston and cylinder arrangement 39. When the shot is held by rod 38, the grippers 15 are caused to retract so as to release the shot, and the sled is then caused to return for the formation of another shot. When the rod 38 is driven into the shot, it is also used as a sensing means to detect whether the shot has been deposited between the matrices carried by the plattens 7 and 8. This is achieved by means of an arrangement 40 which is shown generally in FIG. 1 and in more detail in FIG. 5. The rod 38 is formed at its upper end with a cylinder portion 41, of increases diameter, and this portion 41 is moveable within a hollow cylindrical case part 42 which is attached to the arrangement 39 and carries a microswitch 43. The switch 43 is connected to an electrical sensing circuit 44. The operation of the arrangement 40 is as follows. When rod 38 is driven downwards by piston 39, provided that a shot lies in the press the resistance of the shot causes the portion 41 of rod 38 to contact the upper face of part 42, as shown in FIG. 5. This causes the microswitch to assume a first condition in which it indicates that the shot has been correctly deposited. If, however, the shot has not been so deposited, the portion 41 is free to fall onto the lower face of part 42 so the switch assumes a second condition in which it indicates that the shot is not in the press. In this case, circuit 44 produces a signal on line 45 to prevent closure of the press, which could result in damage to the matrices.

Sled 1 is also provided with a pair of members 16 and 17 mounted for movement in the vertical direction and each of which carries a respective one of rectangular members 18 and 19. Each of members 18 and 19 has a V-shaped notch cut in its inward facing longer edge. In operation, when moulding of a record takes place, platten 8 lifts members 16 and 17 to a position which is such that when the record has been moulded, part of its flash extends into the V-shaped notches in members 18 and 19. Simultaneously with the moulding of the record the rod 38 is caused to form the centre hole of the record. In order to permit the formation of a clean centre hole, the lower end of rod 38 is formed with a cavity which if first conical and then tapped, as shown in FIG. 5. After moulding, the record, held by members 18 and 19, drops vertically away from platten 7 as platten 8 descends and members 16 and 17 drop. The maximum movement of members 18 and 19 away from platten 7 is less than that of which platten 8 is capable, so that at said maximum movement, the members 18 and 19 part company with platten 8, leaving the record supported on the sled by members 18 and 19. The record is then transported by the movement of sled 1 to the trimming station when it is released by the retraction of members 18 and 19, the sled 1 returning for the formation of another shot and the moulding of the previously formed shot.

Sled 1 carries at its far end another transverse member 20 formed with a C-shaped cut-out portion, which when the sled returns to its shot forming moulding position exposes the centre hole of the record, and a retaining member (not shown) is inserted into or through the centre hole to locate and retain the record while the flash is trimmed off. After trimming, the record is removed and stacked as mentioned above.

Figure 4:
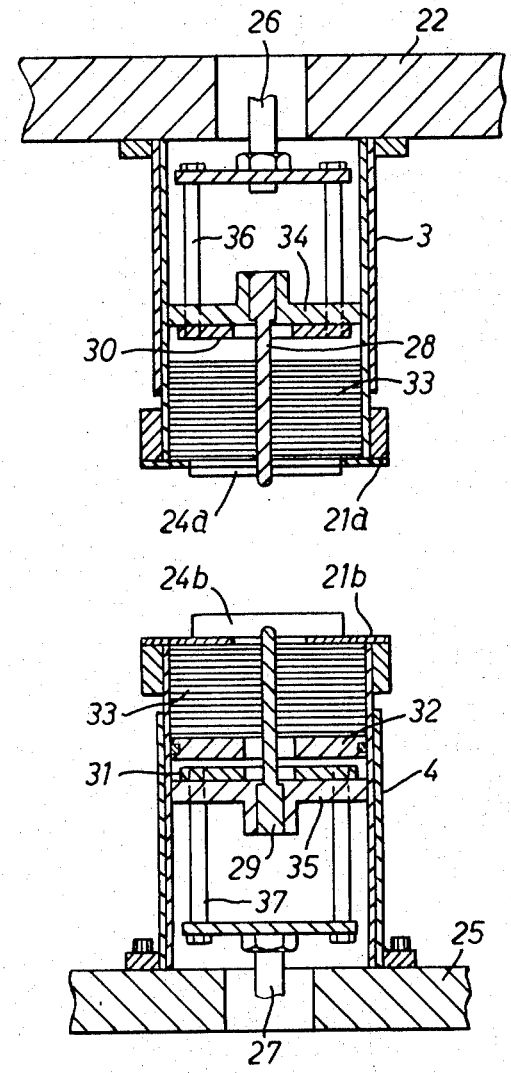
FIG. 4 shows a cross-section through the pair of magazines.

FIG. 4 is a cross-sectional diagram looking in the direction of the pressing station of label magazines 3 and 4, each of which is carried by a respective one of support members 22 and 25. Lables 33 are retained in magazines 3 and 4 by plates 21a and 21b respectively, each of which is formed with a centrally located cut-out which forms a substantially oblong aperture as shown by reference 21 in FIG. 3. The major dimension 21c of the cut-out in plate 21a is arranged to be transverse to the longitudinal arms of sled 1, whereas the major dimension of the cut-out in plate 21b is arranged to be parallel to the longitudinal arms of the sled. The cut-out portion 21 need not be exactly as shown, the most suitable shape for allowing a label to be drawn out of the respective magazine being chosen in each case. The apparatus is such that member 14 of sled 1 lies between plates 21a and 21b in the shot forming position, and in operation magazines 3 and 4 are caused to descend and rise respectively so that the faces of the C-shaped cavity in member 14 are closed by the magazines, flanges 24a and 24b carried by plates 21a and 21b respectively serving to effect closure of the open edge of the C-shaped cavity when abutting. In magazine 3 the labels 33 form a stack which closes the opening in plate 21a, and in magazine 4 a piston 32 retains the labels 33 in a stack in the upper part of the magazine to close the opening in plate 21b. The labesl 33 are stacked around spindles 28 and 29, each carried by respective ones of fixedly mounted plates 34 and 35.

When the C-shaped cavity has been closed to define the shot forming, cavity molten record material is extruded through bore 13, sufficient pressure being applied to the label stacks to maintain a closed cavity against the extrusion pressure. This is achieved by applying pressure to shaft pairs 26 and 27 which are coupled to moveable plates 30 and 31 via, in the one case three shafts such as 36, and in the other case three shafts such as 37, the shafts 36 and 37 passing through fixed plates 34 and 35. When extrusion has taken place, pressure is removed from shafts 26 and 27 and magazines 3 and 4 retracted leaving the first label in each stack adhering to respective sides of the shot, this being allowed to occur by virtue of the openings in plates 21a and 21b. The shot having been thus formed the operation then continues as descirbed above.

Figure 6:
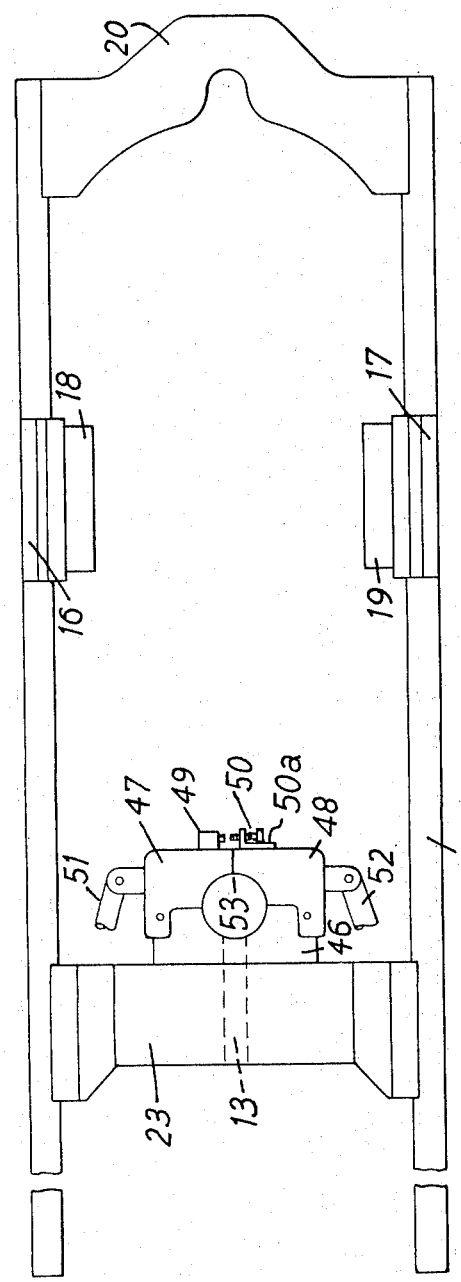
FIG. 6 shows, in similar view to FIG. 2, modified apparatus in accordance with an example of the invention.

In a further embodiment of the invention, as shown in FIG. 6, the shot forming station is modified so as to permit of the depositing, in the shot forming cavity, of a predetermined volume of mouldable material. This is effected by replacing the member 14 and grippers 15 of the FIG. 2 arrangement by a member 46, having a cavity which is semi-circular in plan, and a pair of cavity closure members 47 and 48, which are pivotally mounted on member 46. Each of the closure members 47 and 48 has a cavity which is substantially quarter-circular in plan so that when the two closure members are in the position shown in FIG. 6 a cavity which is substantially circular in plan is formed, and this cavity can be closed at top and bottom by the end plates 21a, 21b of magazines 3 and 4 (see FIG. 4) and by the innermost label of the stack held in each magazine. In this embodiment the flanges 24a and 24b, shown in the FIG. 4 arrangement, are omitted.

Closure member 47 is provided with a microswitch 49 and closure member 48 is provided with an adjustable actuator member in the form of a screw 50 which can be screwed through a tapped hole in a flange 50a. Member 50 is adjusted to hold the switch in one state while the cavity is closed. Each of closure members 47, 48 is operated by a respective rod 51, 52 driven from a respective piston/cylinder arrangement (not shown) mounted on a respective longitudinal arm of sled 1.

In operation, when the shot forming cavity is closed, the motor 2 (see FIG. 1) is operated to drive the extrusion device which extrudes molten record material under pressure into the cavity via bore 13 as described previously. When the cavity is filled with a predetermined volume of material, the two closure members 47 and 48 are urged apart by said material. This causes switch 49 to move away from the screw 50, causing the former to change its state. The change of state of switch 49 is arranged to cause deactuation of the motor 2, thus cutting off the supply of record material.

The magazines 3 and 4 are then driven away from the shot, leaving the two aforementioned labels adhering to respective sides of said shot, and the sled is actuated to transport the shot to the record pressing station; the shot being supported and carried by the members 46, 47 and 48. In order to ensure that the shot remains securely between said three members during transit, it has been found preferable to form the adjacent cavity faces of members 47 and 48 with small depressions so as to provide a keying depression 53.

When the shot is positioned between plattens 7 and 8 the rod 38 is driven into said shot to retain it and sense its presence. This having been done, the rods 51 and 52 are actuated to open the cavity, by moving to the left (in FIG. 6) to pull members 47 and 48 apart by a distance sufficient to clear the shot and labels. The sled 1 then reciprocates and the cavity is again closed in readiness of the next operation.

The magazines 3 and 4 used in either of the embodiments herein described need not be cylindrical. For example, each may comprise a pair of diametrically opposed arcuate struts. This arrangement provides magazines which have the appearance of cylinders with a longitudinal strip cut out of two diametrically opposite regions.

What we claim is:

1. Apparatus for the production of gramophone records in which, in operation, a shot of mouldable record material with labels adhering thereto is formed then transferred to a record moulding station, the apparatus including a record moulding press, transport means for transferring the shot and adhering labels to said moulding press, means defining a shot forming cavity and means for extruding mouldable record material into said cavity to form said shot, the arrangment being such that parts of said cavity defining means comprise respective parts of a pair of label magazines while said record material is extruded into said cavity and into contact with an exposed part of a respective label in each said magazine, said respective parts of said magazines comprising respective end plates having respective substantially oblong apertures therein exposing said exposed parts of said respective labels and through which apertures said respective labels can be withdrawn from said magazines.

2. Apparatus according to claim 1 in which said end plates are so disposed that the major dimension of one of said respective oblong apertures is parallel to the direction of transfer of said shot and adhering labels and the major dimension of the other of said respective ablong apertures is transverse to said direction of transfer.

3. Apparatus according to claim 1 in which a part of said cavity defining means forms a part of said transport means.

4. Apparatus according to claim 3 in which said part of said cavity defining means which forms part of said transport means includes a pair of reciprocable gripper members formed of polytetrafluoroethylene.

5. Apparatus according to claim 3 in which said part of said cavity defining means which forms part of said transport means includes a pair of pivotable closure members, and in which means are provided for pivoting said closure members to release said shot and adhering labels to said record moulding press.

* * * * *